Aug. 25, 1931.  A. L. DUNCAN  1,820,351
PARING APPARATUS
Filed April 9, 1926  2 Sheets-Sheet 1
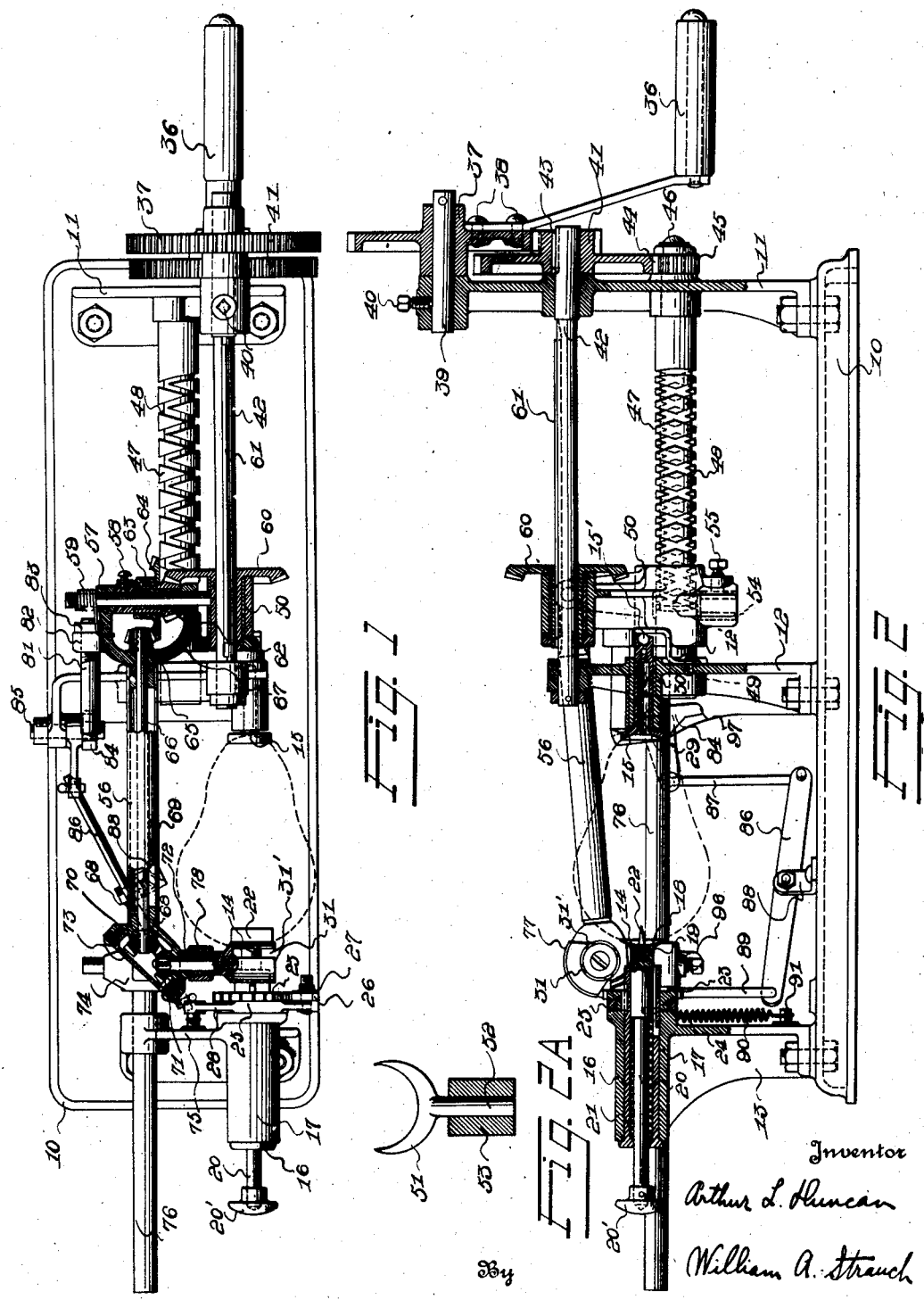
Inventor
Arthur L. Duncan
William A. Strauch
By
Attorney Aug. 25, 1931.  A. L. DUNCAN  1,820,351
PARING APPARATUS
Filed April 9, 1926  2 Sheets-Sheet 2
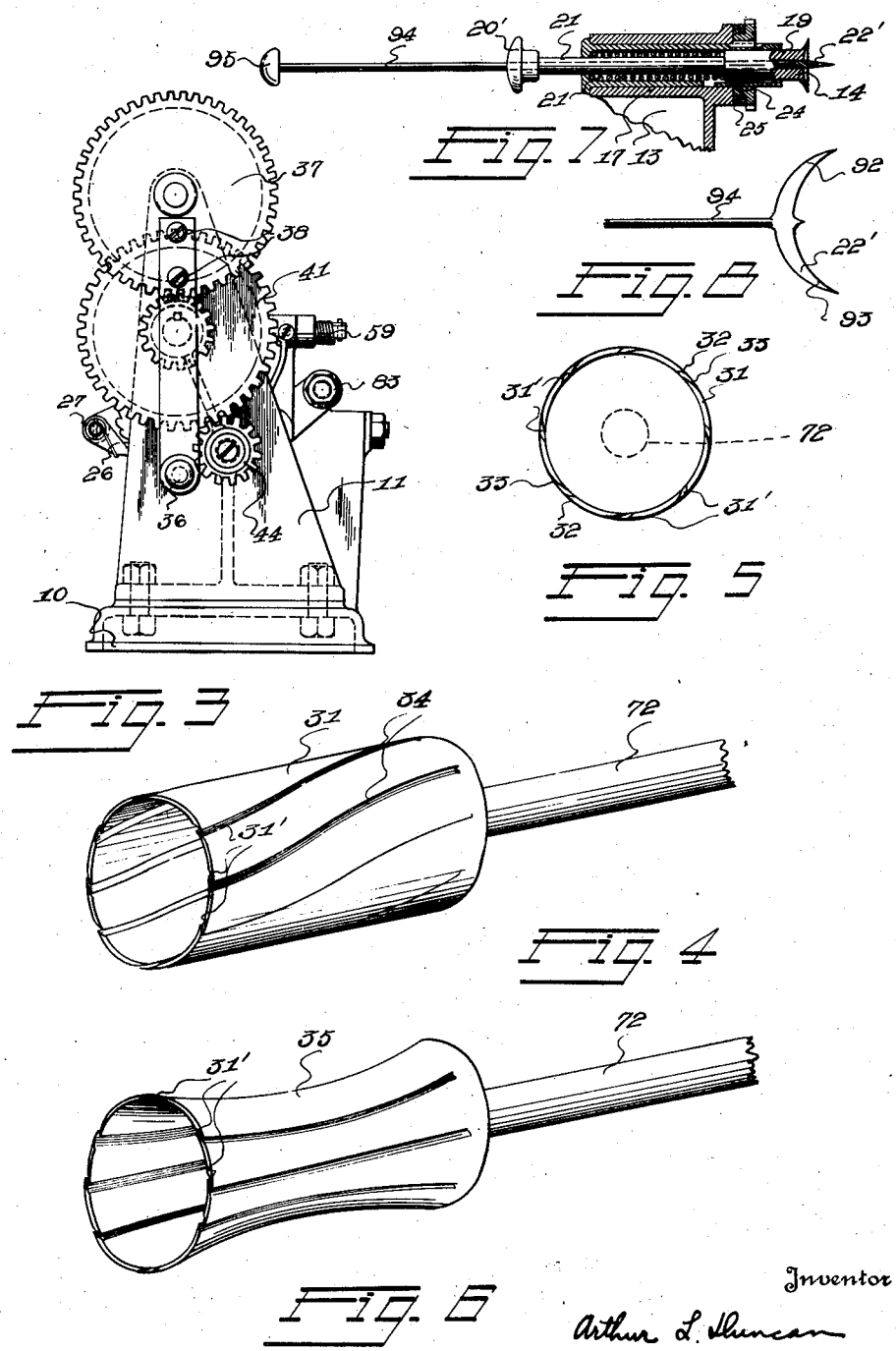

Patented Aug. 25, 1931

1,820,351

UNITED STATES PATENT OFFICE

ARTHUR L. DUNCAN, OF PIEDMONT, CALIFORNIA, ASSIGNOR TO ACME CANNING MACHINES COMPANY, OF RENO, NEVADA, A CORPORATION OF NEVADA

PARING APPARATUS

Application filed April 9, 1926. Serial No. 100,954.

The present invention relates to paring and peeling apparatus and more particularly to improved apparatus for paring fruit, such as pears, apples and the like and also for peeling vegetables.

It has been proposed to peel pears by using machines in which the pear is rotated on its longitudinal axis against a knife constructed to remove the outer surface or skin of the fruit. As the pear is revolved in such devices, the knife removes the skin in circumferential cuts leaving a series of circumferential ridges around the fruit, and giving the fruit an undesirable appearance.
This type of machine for peeling pears has been discarded in the higher grade canneries, and the higher grade pears are now peeled with the skin removed by cutting thin longitudinal slices from the pear. The operation of hand peeling pears as now practiced is slow and consists in holding the pear to be peeled in the palm of one hand, while employing the other hand to move a specially constructed knife from end to end of the pear in successive strokes until the peeling is completed. The specially constructed knife consists of a straight or concave edge blade provided with a depth guard spaced from the cutting edge. The guard must be spaced from the cutting edge a sufficient distance to allow the blade to reach into all depressions or irregularities on the surface of the pear. When so spaced a very large waste occurs due to the fact that the depth of the cut is greater than is necessary under ordinary conditions, the adjustment being made to meet the extraordinary conditions frequently met with.

Accordingly one of the main objects of my invention is to pare the fruit with a cutter that automatically follows the contour of the fruit, and which, preferably, rotates rapidly so that the skin is removed in comminuted condition or small pieces by what is essentially a scraping action. In such a cutter is is not necessary or desirable to space the guard edge a relatively great distance from the cutting edge as in the hand cutters at present in use. In this way waste due to irregularities in shape of the pears which now occurs in the hand peeling methods is avoided.

It is to be noted that pears are received in the canneries in between the times when different crops of peaches ripen. With my improved peach pitting methods and devices that have been recently developed, the amount of labor necessary to pit peaches is reduced considerably below that necessary to hand peel pears. In order to have enough labor to hand peel the pear crops, an oversupply of labor for the pitting of peaches must be at present kept if the most improved and efficient methods of pitting the peaches are utilized.

Accordingly a further object of the present invention is to provide apparatus for the peeling of pears in rapid and efficient manner, leaving fruit of high grade appearance, although it should be understood that the apparatus is adapted to the peeling of other fruits and vegetables as well as pears.

It is a further object of the invention to provide an apparatus for removing the peel by cuts that extend lengthwise of the article to be pared, or both circumferentially and lengthwise, rather than solely circumferentially or substantially so. By this arrangement the objectionable ridge, that appears on pears peeled substantially circumferentially by the prior methods, does not appear and fruit peeled in accordance with my invention has substantially a shape and surface appearance conforming to the original outside contour of the unpeeled fruit.

Another object of the invention is to provide a machine embodying a cutter which is rotated at fairly high speed as it travels bodily lengthwise of the fruit to remove relatively tough skins from delicate fruit without injury to the quality of the product.

A further object of the invention is to provide a novel cutter provided with spiral or straight slots, the edges of which are beveled to provide a satisfactory cutting edge and a spaced edge that serves to gauge the depth of the cut.

A still further object of the invention is to provide a machine embodying a rotary cutter turning about an axis which moves endwise of the fruit, and which includes means to automatically and intermittently shift the relative position of the fruit and cutter so that the skin will be removed rapidly and effectively without close attention by the operator.

Still further objects of the invention will appear as the description thereof proceeds with reference to the accompanying drawings, in which Figure 1 is a horizontal section of the preferred embodiment of my invention.

Figure 2 is a vertical sectional view of the machine shown in Figure 1.

Figure 2a is a detail view of the yoke engaging the feed screw.

Figure 3 is an end elevation looking toward the left of Figure 2.

Figures 4 and 5 are detail views of my improved cutter.

Figure 6 is a modified form of cutter.

Figure 7 is a vertical cross sectional view of a modified form of holder embodying a hand operated halving knife.

Figure 8 is a detail showing the halving knife in plan.

Like reference numerals refer to like parts throughout the several figures.

On a base 10 suitable standards 11, 12 and 13 are secured. The fruit, such as a pear, is supported in aligned holders 14 and 15 carried by standards 12 and 13 respectively. Holder 14 is carried by a sleeve 16 rotatably mounted in a cylindrical extension 17 of the standard 12. Holder 14 comprises a concaved head 18, a body portion 19, which is slidably keyed in sleeve 16, and a stem 20 provided with a handle 20' suitably secured thereto. Holder 14 is urged toward holder 15 by a coil spring 21, but may be drawn rearwardly against the action of spring 21 when it is desired to release the fruit. In order to maintain the fruit from rotating with respect to the holder, a blade 22 designed to enter the blossom end of the fruit is provided.

Keyed to and rotatable with sleeve 16 is a ratchet wheel 23. Ratchet wheel 23 is provided with a cylindrical extension 24, serving as a bearing for a rotatably mounted ring 25, which carries a pawl 26 urged into engagement with the teeth of ratchet 24 by a spring 27 (see Figure 3). Ring 25 is provided with an arm 28 connected to an actuating mechanism as will more fully hereinafter appear.

Holder 15 is provided with a concave head 29 and is bored longitudinally as shown at 30 to receive the stem of the fruit. This holder is freely rotatable in standard 12, and is held from endwise movement by a bracket 12' between which and the end of the holder a ball 15' is mounted to reduce the friction between these parts when the fruit is turned about its longitudinal axis. Obviously, holders of differing sizes and forms may be employed in accordance with the kind of fruit being operated upon.

The fruit held between holders 14 and 15 is pared by a rotating cutter 31 in the form of an open ended cylinder, slotted as at 31' from the open end to provide a plurality of cutting edges. The cutting edges are beveled as shown at 32 (Figure 5) and the adjacent edge of each slot is likewise beveled as shown at 33. As will be readily understood these edges determine the depth of the cut. Instead of the straight slots shown in Figures 5 and 6 of the drawings, spiral slots or other type of slots as at 34 (Figure 4) may be used, or when it is desired to take a wider cut, the cylinder may be made concave as shown at 35 (Figure 6).

The cutter rotates about an axis which is substantially at right angles to the vertical plane containing the axes of holders 14 and 15, and is moved bodily back and forth over the surface of the fruit from end to end thereof. Between each stroke of the cutter the fruit is rotated about its longiudinal axis by the ratchet 23 and pawl 26.

The machine is operated by a handle 36 fixedly secured to a gear 37 by screws 38. Gear 37 turns freely on a shaft 39 held in standard 11 by a set screw 40. Gear 37 meshes with and drives a double gear 41, which in turn is secured to shaft 42, journalled in standards 11 and 12 by means of key 43. Gear 41 is provided with spur teeth 44 meshing with a pinion 45 which is secured to and drives shaft 46. Shaft 46 has secured thereto or formed integrally therewith, a feed screw 47 with a continuous spiral groove 48 having oppositely inclined sections cut therein. The opposite end of the feed screw is journalled in standard 12 as shown at 49.

Mounted for reciprocation on shaft 42 and feed screw 47 is a carriage 50. To cause reciprocation of carriage 50 a yoke 51 (Figure 2a) provided with a stem 52, is rotatably mounted in a bushing 53, which in turn is supported in a bore 54 in casting 50. Set screw 55 maintains bushing 53 and yoke 51 in a position in which the yoke rides in the grooves 48 of the feed screw. As screw 47 is rotated the yoke 51 will be moved along groove 48 shifting the carriage 50 endwise. When the yoke 51 reaches an end of one spiral section of groove 48 it automatically turns in bushing 53, inclining in the opposite direction and enters the opposite section of groove 48, automatically reversing the direction of movement of the carriage 50.

Cutter 31 and the means for rotating it are carried on an arm 56 which swings on a spindle 57 fixed in carriage 50 by a set screw 58. A portion of the weight of arm 56 and the parts carried thereby is supported by a spring 59 coiled around and secured to spindle 57 so that the cutter rests with the proper degree of pressure on the fruit and may readily follow the contour of the fruit as it moves back and forth.

Journalled in carriage 50 and slidably mounted on shaft 42 is a bevel gear 60 which is slidably keyed to shaft 42 by a long feather 61. Gear 60 meshes with and drives bevel pinion 62 rotatably mounted on spindle 57. Pinion 62 is provided with a cylindrical extension 63 upon which is keyed a bevel gear 64 meshing with bevel pinion 65 secured to a shaft 66. Shaft 66 is journalled in a yoke 67 of arm 56 and in a casting 68 secured to yoke 67 by a tubular member 69 through which shaft 66 passes. Keyed to the end of shaft 66 is a bevel gear 70 meshing with and driving a bevel gear 71 keyed to the spindle 72 of the cylindrical cutter 31. A plate 73 is secured to casting 68 and serves to house the gears 70 and 71.

In order to prevent engagement of the rotating cutter with the holder 14 at the completion of a stroke and to hold it in position at other times, a table 74 is provided to receive casting 68. Table 74 is formed on top of bracket 75 secured to a rod 76. Rod 76 is secured to carriage 50 and is slidable through standards 12 and 13 reciprocating with the carriage. As will be readily understood the cutter rises from table 74 to follow the contour of the fruit and rests on the table at times when the engagement of the cutter with the fruit does not cause it to be lifted therefrom. A shield 77 for the rotating knife secured to a casting 68 by collar 78 is provided.

The mechanism to intermittently turn the fruit after each cut is actuated by a tappet 81 in the form of a threaded rod adjustably mounted in a projection 82 of the carriage 50. This rod is held in adjusted position by a nut 83. When the carriage reaches the end of its forward stroke tappet 81 engages the upper arm of a bell crank lever 84 pivoted to the standard 12 at 85. The other arm of lever 84 is connected to one end of a lever 86 by a link 87. Lever 86 is pivoted between its ends to a bracket 88 secured to the frame 1. The other end of lever 86 is pivotally connected to a link 89, which is secured to arm 28 of ring 25, the latter carrying pawl 26 which engages ratchet wheel 23 before referred to. A coil spring 90 between arm 28 and a pin 91 secured to standard 13 returns the ratchet operating mechanism to its original condition after each operation. As the cutter operates on its return as well as on its forward stroke, means are provided to shift the fruit after each return stroke. This is effected by a pin 96 carried by table 74 and accordingly movable with carriage 50. Pin 96 engages the lower arm 97 of bell crank lever 84 causing angular movement of the fruit by the mechanism just described.

Instead of turning the fruit intermittently, it may be turned continuously at a fairly high rate of speed and the rotating cutter may be moved lengthwise of the fruit, or the holders may be rotated slowly with a continuous movement, thereby causing the cutter to remove helical strips of the skin. This form of the invention is contemplated as one of the preferred forms thereof. In this operation it should be noted that the movement of the cutter is both circumferential and from end to end of the fruit.

In operation of the form of my invention shown in Figures 1, 2 and 3, a fruit, such as a pear, is placed between holders 14 and 15, the former of which is retracted by handle 20' to permit ready insertion of the fruit. When handle 20' is released the blade 22 is caused by spring 21 to be imbedded in the fruit thereby holding it unmovable with relation to the holders. The operator then rotates handle 36 causing the cutter 31 to rotate and at the same time causing the carriage 50 to move forwardly. The cutter yieldingly engages the fruit removing the skin thereof as it follows the contour of the fruit cleaning out the depressions thoroughly. Upon completion of a stroke of the carriage the holder 14 is turned by ratchet 23 to expose another portion of the fruit to the action of the cutter 31. This operation is repeated until the entire skin is removed. The operator then withdraws the fruit by retracting handle 20' to separate the holders.

In the modification shown in Figures 7 and 8, the blade 22 to hold the fruit from rotating relative to holder 14 is replaced by a blade 22' that has laterally extending wings 92 and 93 the sum of whose overall length is substantially equal to the greatest thickness of the fruit to be operated upon. During the operation of removing the skin of the fruit blade 22' functions as does the blade 22 in Figures 1 and 2. At the completion of the paring operation, however, the operator halves the fruit while it is held between the holders by moving blade 22' through said fruit. To effect this result blade 22' is secured to a rod 94 which may be flat extending through and slidably supported but not rotatable in body portion 19, stem 21 and handle 20', which in this form of the invention are made hollow to support rod 94. A handle 95 is provided on rod 94. After the fruit has been pared the operator forces knife 22' endwise through the fruit while still held between the cups 14 and 15 to separate the pulp in halves.

It will be obvious that various mechanisms may be utilized to carry out my improved method of paring or peeling articles. Instead of rotating the fruit step by step, the rotation may be continuous in obvious manner, or the fruit may be held stationary and the cutters may be rotated around the fruit. My method also may be carried out by holding a pear or fruit to be peeled between the stem and blossom end and drawing a rotating cutter or any other type of suitable cutter longitudinally along the fruit, to remove slices around the surface thereof. It will be accordingly understood by those skilled in the art that the invention is not limited to the particular details hereinbefore set forth, but the scope thereof is to be limited only by the terms of the appended claims. Accordingly, having described a preferred embodiment of my invention, what is desired to be secured by Letters Patent and claimed as new is:

1. A fruit paring machine comprising means to hold the fruit; means to pare the fruit comprising a rotary head carrying a plurality of cutters; and means to bodily rectilinearly reciprocate said head endwise of the fruit.

2. A fruit paring machine comprising means to hold the fruit; means to pare the fruit comprising a rotating cutter embodying a plurality of cutting blades and a guard adjacent each blade to determine the depth of the cut; and means to cause relative movement between said cutter and said fruit in a substantially rectilinearly direction toward and from the stem of the fruit.

3. A fruit paring machine comprising fruit holders designed to receive the blossom and stem ends of the fruit; means to pare the fruit; mechanism to actuate said last named means between said holders; and means to intermittently rotate said holders and the fruit carried thereby.

4. A fruit paring machine comprising holders for the fruit designed to yieldingly engage the stem and blossom ends of the fruit; a paring cutter; means to move said cutter endwise of the fruit; and means to intermittently shift said holders and the fruit carried thereby to expose an unpared surface of the fruit to the action of said cutter.

5. A fruit paring machine comprising holders for the fruit designed to yieldingly engage the stem and blossom ends of the fruit; a paring cutter yielding mounted to swing on an axis at right angles to the axis of the holders; means to move said cutter endwise of the fruit; and means to intermittently shift said holders and the fruit carried thereby to expose an unpared surface of the fruit to the action of said cutter.

6. A fruit paring machine comprising holders for the fruit designed to yieldingly engage the stem and blossom ends of the fruit; a paring cutter mounted to swing bodily about an axis at right angles to the axis of the holders; means to cause relative endwise motion between said cutter and the fruit carried by said holders; and means to cause intermittent relative angular movement between said cutter and said fruit.

7. A fruit paring machine comprising holders for the fruit designed to yieldingly engage the stem and blossom ends of the fruit; a paring cutter; means to move said paring cutter endwise of the fruit; and means to intermittently shift said fruit angularly with respect to said cutter.

8. A fruit paring machine comprising holders for the fruit designed to yieldingly engage the ends of the fruit; a paring cutter; means to rotate said cutter; means to move said cutter bodily endwise of the fruit; and means to cause intermittent relative angular movement between said cutter and said fruit after each operation of the paring cutter.

9. A fruit paring machine comprising holders designed to yieldingly engage the blossom and stem ends of the fruit; a yieldingly mounted cutter swinging about an axis in a plane at right angles to the axis of the holders; means to rotate said cutter; means movable with said cutter to support it when not in engagement with the fruit; and means to bodily reciprocate said cutter endwise of the fruit.

10. A fruit paring machine comprising holders designed to yieldingly engage the blossom and stem ends of the fruit; a yieldingly mounted cutter; means to rotate said cutter; means movable with said rotating cutter to support it when not in engagement with the fruit; and means to move the cutter endwise of the fruit.

11. A cutter for a fruit paring machine comprising an open ended cylinder slotted inwardly from said open end; the edges of said slots being beveled to provide cutting edges and edges to determine the depth of the cut.

12. A cutter as defined in claim 11 in which the cylinder is made concave.

13. A cutter as defined in claim 11 in which the slots are helical in form.

14. A pear peeling machine comprising means to hold the pear at its stem and blossom ends, a cylindrical paring cutter having a plurality of cutting and guard edges, each of said cutting and guard edges being arranged relatively close together, means to rotate said cutter about an axis transverse to the longitudinal axis of said pear, and mechanism to simultaneously reciprocate said cutter in a straight line endwise of said pear.

15. A pear peeling machine comprising means to yieldingly hold a pear at its stem and blossom ends, a cylindrical cutter having cutting edges and guard edges arranged closely adjacent said cutting edges, said cylindrical cutter being so formed that said cylinder is approximately tangent to the pear surface at substantially all points, as it is revolved, and mechanism to simultaneously rotate said cutter about an axis transverse to the longitudinal axis of said pear, and to cause relative rectilinear motion endwise of the pear between said cutter and said pear.

16. A pear peeling machine comprising a rotatable cylindrical cutter having a plurality of cutting edges extending lengthwise of the axis of rotation of said cutter, and a plurality of guard edges arranged relatively close to said cutting edges, means to rotate said cutter, means to cause said cutter to move relative to the pear in straight lines extending between the stem and blossom ends of the pear, and mechanism to cause said cutter to freely follow the contour of said pear.

17. A fruit paring machine comprising holders for the fruit designed and arranged to engage the stem and blossom ends of the fruit, at least one of said holders being yieldingly urged toward the other to grip the fruit irrespective of its length, a cutter carriage arranged to move endwise of the fruit, yielding arm pivoted on said carriage for movement about an axis disposed in a plane at right angles to the line of movement of said carriage, a cutter shaft journalled in said arm for rotation about an axis parallel to said first named axis, mechanism permitting free movement of said arm about its pivot for rotating said cutter shaft, and a cutter having a plurality of separately guarded cutting edges secured to said last named shaft.

18. The combination defined in claim 17 in which said mechanism comprises a gear on the shaft constituting the arm pivot, a shaft extending lengthwise of said arm and journalled therein, said last named shaft carrying a gear meshing with said first named gear and a second gear arranged to drive said cutter shaft.

In testimony whereof I affix my signature.

ARTHUR L. DUNCAN.